United States Patent [19]
Saito et al.

[11] Patent Number: 5,011,271
[45] Date of Patent: * Apr. 30, 1991

[54] LIGHT SHUTTER ARRAYS FOR FORMING IMAGES

[75] Inventors: Itaru Saito; Ken Matsubara; Kouichi Shingaki; Tomohiko Masuda; Hirohisa Kitano, all of Osaka, Japan

[73] Assignee: Minolta Camera Kabushiki Kaisha, Osaka, Japan

[*] Notice: The portion of the term of this patent subsequent to Aug. 8, 2006 has been disclaimed.

[21] Appl. No.: 282,304

[22] Filed: Dec. 9, 1988

[30] Foreign Application Priority Data

Dec. 11, 1987 [JP] Japan ................... 62-315007

[51] Int. Cl.$^5$ .................... G02F 1/01; G02F 1/03
[52] U.S. Cl. ......................... 350/356; 350/355
[58] Field of Search ............ 350/392, 384, 371, 355, 350/356

[56] References Cited

U.S. PATENT DOCUMENTS

| | | | |
|---|---|---|---|
| 4,222,638 | 9/1980 | Robert | 350/374 X |
| 4,707,081 | 11/1987 | Mir | 350/388 |
| 4,765,721 | 8/1988 | Agostinelli et al. | 350/389 |
| 4,802,741 | 2/1987 | Kaukeinen | 350/356 X |
| 4,854,678 | 8/1989 | Kitano et al. | 350/355 X |

FOREIGN PATENT DOCUMENTS

| | | |
|---|---|---|
| 60-159722 | 8/1985 | Japan . |
| 60-170828 | 9/1985 | Japan . |
| 61-38927 | 2/1986 | Japan . |
| 0090127 | 5/1986 | Japan ................... 350/356 |
| 0079418 | 4/1987 | Japan ................... 350/356 |
| 1534027 | 11/1978 | United Kingdom . |

Primary Examiner—Eugene R. LaRoche
Assistant Examiner—Michael B. Shingleton
Attorney, Agent, or Firm—Burns, Doane, Swecker & Mathis

[57] ABSTRACT

A light shutter means with a plurality of shutter elements formed of an electro-optical material, the elements being defined independently and three-dimensionally on an upper face of a substantially polyhedral chip and aligned in at least two arrays. Each shutter element has a shutter window for selective light transmission therethrough. A common electrode for the shutter elements extends over opposing faces of the shutter element arrays and to at least one side face of the chip. Each opposing pair of the elements in the one array and in the other array are disposed such that their shutter windows are overlapped with each other as viewed from a direction normal to the direction of element array extension on the chip's upper face.

29 Claims, 10 Drawing Sheets

LIGHT SHUTTER ARRAYS FOR FORMING IMAGES

BACKGROUND OF THE INVENTION

1. FIELD OF THE INVENTION

The present invention relates to a light shutter means for forming images and more particularly to a light shutter means including a plurality of shutter elements aligned in arrays and defined three-dimensionally on a chip made of an electro-optical material, with the elements being disposed on both sides of a common electrode.

2. DESCRIPTION OF RELATED ARTS

A known light shutter means commonly used and commercially available is a flat face electrode type including a board type body made of such an electro-optical material as PLZT with an electrode pattern being formed on its surface.

The known light shutter means has the disadvantages of a high driving voltage, tendency to function erroneously because of cross talk attributable to interelectrode capacitance between an adjacent pair of electrodes and also of slow response.

With a view to the above problems, the prior art such as a Japanese Laid-Open Patent Publication No. 60-159722 suggested a so-called parallel electric-field type light shutter means having a plurality of three-dimensionally formed shutter elements aligned in arrays and electrodes disposed on an opposing face.

With the above light shutter means, however, because of the relatively long distance between the respective three-dimensional shutter elements, if the array is used in an optical printer, the inter-dot distance is also enlarged thereby deteriorating dot continuity or density. In short, there still remains room for improvement in its image quality.

The present inventor disclosed in his related prior application various light shutter means including a plurality of shutter elements aligned in arrays and defined three-dimensionally on a chip made of an electro-optical material, with the elements being disposed on both sides of a common electrode, and also suggested that a high quality image is obtainable through adjustment of print timings of each array for the purpose of decreasing the inter-dot distance.

Then, for driving such light shutter means, it is necessary to connect independent electrodes of respective shutter elements and a common electrode between an adjacent element array pair with an external circuit, respectively.

However, the problem remains that it is very difficult to extend a lead line from the narrow common electrode disposed at the small space between the array pair so as to connect the same with the external circuit.

Further, if a plurality of light shutter means of the above-described type are used in alignment as a printing head of an optical printer, the common electrodes of respective arrays need be connected one by one with the external circuit. Since such connections are even more difficult, there tend to occur insufficient or improper connections between the common electrodes, which result in unstable driving of the printer head.

SUMMARY OF THE INVENTION

The primary object of the present invention is to improve and facilitate the connection between the common electrode and the external circuit of the light shutter means of the aforementioned type.

In order to accomplish this object, according to a light shutter means related to the present invention, a common electrode provided over opposing faces of at least two shutter element arrays extends to at least one side face of the chip. Also, each opposing pair of the shutter elements in the one array and in the other array are disposed such that their shutter windows for selective light transmission therethrough are overlapped with each other as viewed from a direction normal to the direction of shutter array extension on the chip's upper face.

With the above-described light shutter means, the common electrode extends to at least one side face of the shutter array chip to be connected with the external circuit. Consequently, the connection between the common electrode and the external circuit may be carried out very easily.

Further, if a plurality of this light shutter means are used as a printing head of an optical printer, it becomes no longer necessary to connect the common electrodes of respective arrays one by one and the common electrode may be extended from each shutter array.

Moreover, since each opposing pair of the shutter elements in the one array and in the other array are positionally overlapped with each other as viewed from a direction on the chip upper face in which shutter windows thereof for selective light transmission therethrough vertically cross the element arrays, the formations of respective elements and electrodes may be extremely simplified as will be detailed later.

The foregoing and other objects, features and advantages of the invention will be apparent from the following more particular description of preferred embodiments of the invention, as illustrated in the accompanying drawings.

BRIEF DESCRIPTION OF THE DRAWINGS

Accompanying drawings illustrate preferred embodiments of a light shutter means related to the present invention; in which.

DESCRIPTION OF PREFERRED EMBODIMENTS

Preferred embodiments of the present invention will be detailed hereinafter with reference to the accompanying drawings.

First, a light shutter means related to a first embodiment will be described with reference to FIG. 1 through FIGS. 12a and 12b.

In this embodiment, a flat plate type PLZT wafer 1 is employed as a chip 1 having an electro-optical effect. A PLZT wafer has the known advantage of permitting a light shutter array with low-voltage drivability. This PLZT wafer 1 has the physical dimensions of 50 mm length, 5.0 mm width and 0.5 mm thickness.

Figure 1:
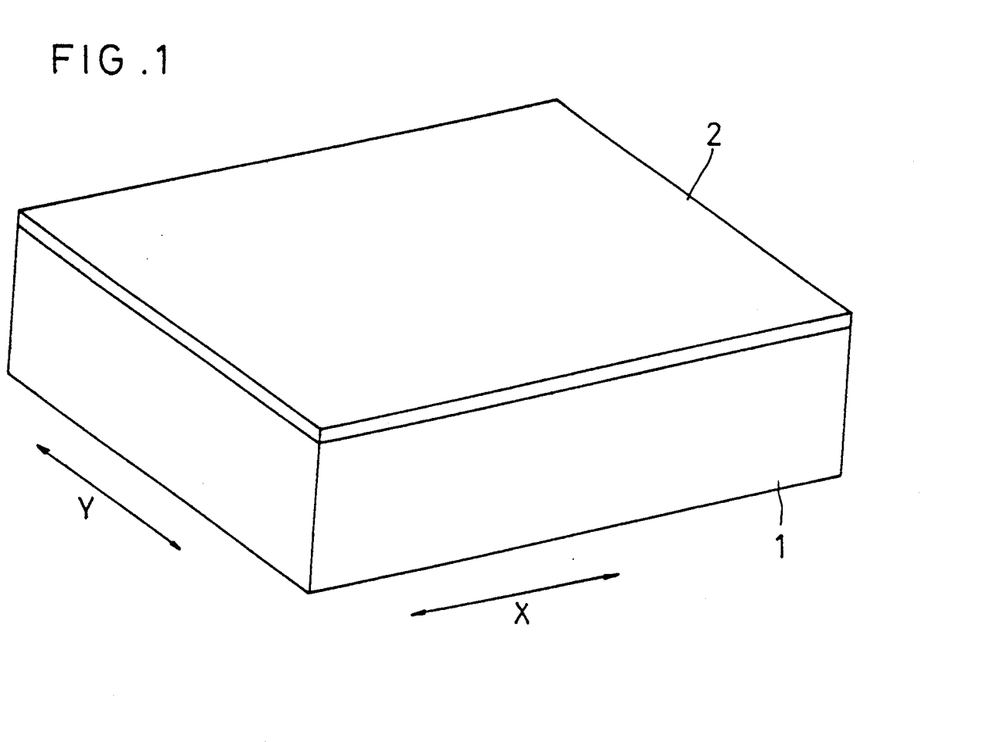
FIGS. 1 through 7 are perspective views illustrating manufacturing processes of a light shutter means related to a first embodiment of the present invention.

As shown in FIG. 1, an entire surface of one side of the PLZT wafer 1 is spinner-coated with a resist film 2 of PIQ (manufactured by Hitachi Kasei Corp.) which is a polyimide resin. This resist film 2 is utilized for eliminating an electrode metal film by the lift-off method.

For the sake of convenience in the following description, a longitudinal direction of the PLZT wafer 1 is designated as an X axis while a direction normal thereto is designated as a Y axis as shown in FIG. 1.

Then, a groove 3 (see FIG. 2) acting as a common electrode is formed by precise cutting at the center of PLZT wafer 1 (coated with the resist film 2) over an entire X-axis length of the wafer 1. In this cutting operation of the groove 3, a dicing saw having a diamond blade with a 40 μm blade thickness was used. The formed groove 3 has a 110 μm width and a depth (a) of 160 μm measured from the outer surface of the PLZT wafer 1.

Figure 2:
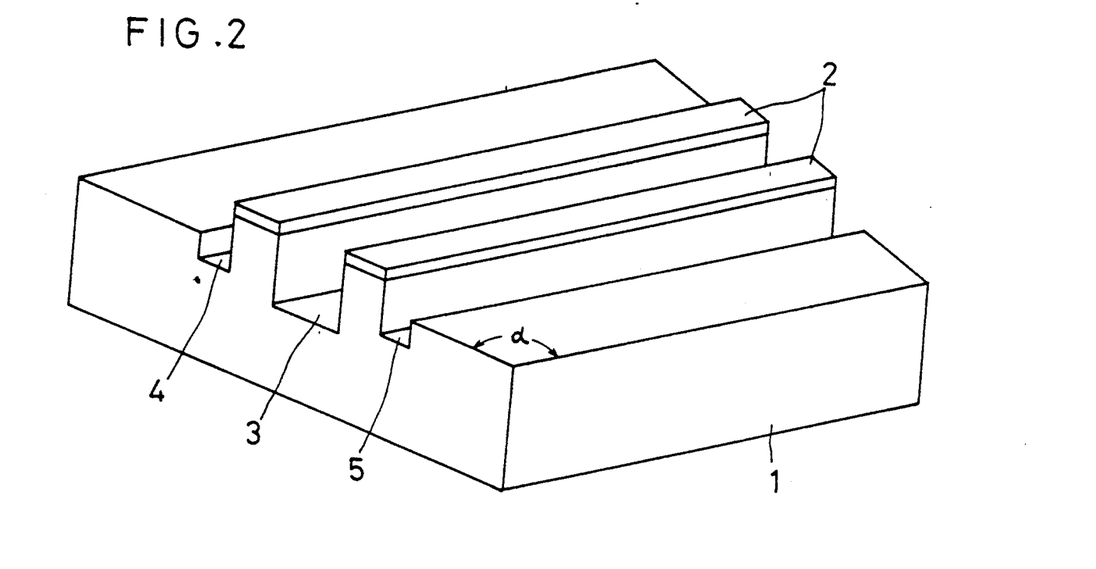

Next, further grooves 4 and 5 acting as independent electrodes are formed by precise cutting over the entire X-axis length of the wafer 1 in parallel with the common electrode groove 3, with the grooves 4 and 5 each having a predetermined distance from a side edge of the groove 3 and having a 300 μm width and a depth b of 120 μm which is shorter than the depth a of the groove 3. In forming these grooves 4 and 5, it may be possible to use the same diamond blade as used for cutting the common electrode groove 3. However, for avoiding chipping-off at shutter edges, the diameter of the diamond of this blade should be as small as possible. Incidentally, the distance between the adjacent grooves 3 and 4 or 3 and 5, namely the width of a convex portion acting as a shutter, and the depths a and b of the grooves 3, 4 and 5 may be conveniently determined within the precision of the cutting operation to obtain a desired performance of the light shutter array. However, care should be taken in any case such that the condition of a>b be always satisfied.

After the above formation of grooves 4 and 5, as now shown in FIG. 2, the resist film 2 except for the shutter portion is eliminated by cutting the surface of PLZT wafer 1 with a depth c of 160 μm from the respective grooves 4 and 5 to the side ends of the wafer 1, i.e. along the Y axis. For this cutting operation, a further diamond blade with a 140 μm blade thickness was employed. Incidentally, this diamond blade need not have such an extremely small diamond diameter as that employed in the cutting of grooves 4 and 5 but may be of a relatively large diamond diameter easier to use. After this elimination of resist film 2 (except for the shutter portion), the region now uncoated with the film 2 has a rough surface as the result of cutting operation.

Thereafter, one longitudinal, i.e., perpendicular to the X-axis, end of the above PLZT wafer 1 is cut in its entirety with an angle α of 154 degrees relative to the X axis.

Figure 3:
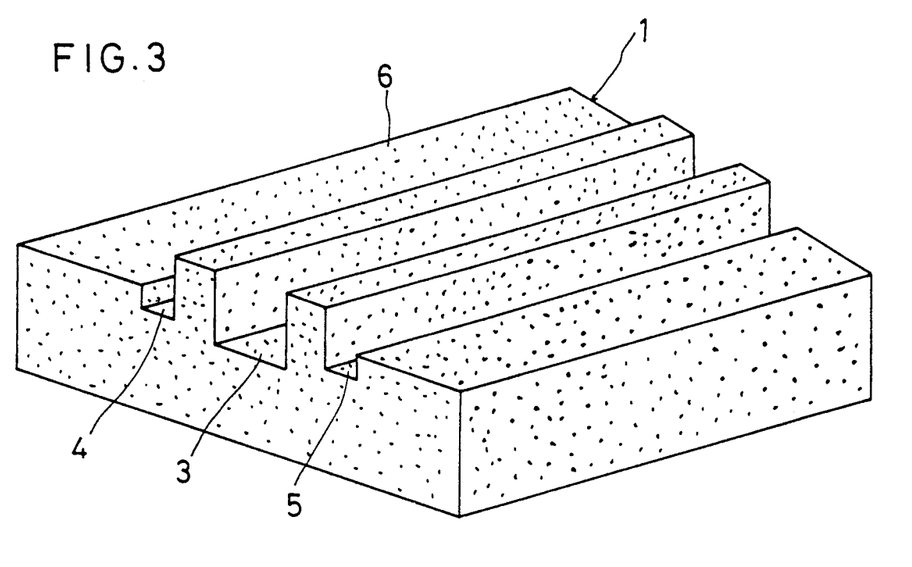

Next, as shown in FIG. 3, this PLZT wafer 1 is coated on its surface and side faces with an aluminum film 6 acting as an electrode. For this coating operation, a magnetron sputtering device was used under the conditions specified in the Table 1 below. Namely, through a cleaning treatment by reverse sputtering and a subsequent sputtering, the aluminum film 6 having a thickness of approximately 3 μm was formed on the respective faces of PLZT wafer 1.

TABLE 1

| source | reverse sputtering high frequency wave | sputtering direct current |
|---|---|---|
| vacuum degree | $5 \times 10^{-2}$ Torr | $3 \times 10^{-2}$ Torr |
| power | 100 W | 1A/350 V |
| time | 1 min | 15 min |

With the above coating of aluminum film 6 on the cut and rough faces of the PLZT wafer 1, the contact area between the aluminum film 6 and the PLZT wafer 1 is increased and the film 6 is placed in firm contact on the wafer 1 with concave-to-convex engagement therebetween according to the different heights of different surface portions of the wafer 1.

Figure 4:
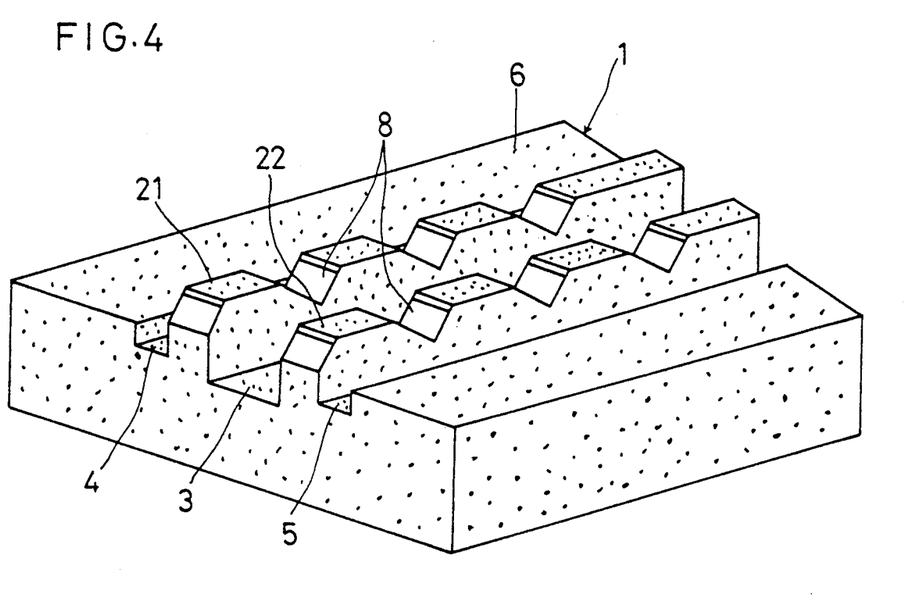

Next, in the surface of the PLZT wafer 1 which is now coated with the aluminum film 6 and between the groove 3 and the grooves 4, 5, i.e. at the convex portions acting as shutters, a plurality of V-shaped grooves 8 are cut one by one so as to form partially separated shutter elements 21 and 22. Referring more particularly to these cutting operations, a center of the diamond blade 7 in FIG. 9 with an edge angle θ of 60 degrees and a blade width D of 200 μm is placed at the cut end of the PLZT wafer 1 and thus positioned blade 7 is driven at the same angle as the cutting angle α relative to the X axis so as to remove a corner of the convex shutter portion; then, the respective V-shaped grooves 8 are cut with a constant pitch of e.g. 152 μm. In the above operations, the groove width at the upper edge of V-shaped groove 8 may be adjusted by varying a depth of the groove 8. In this particular embodiment, the groove width at the upper edge of V-shaped groove 8 is arranged to substantially equate with the width of respective shutter elements 21 and 22 and also to fall short of the cutting depth c of the surface of PLZT wafer. As the result, as shown in FIG. 4, the V-shaped grooves 8 are formed only at the convex shutter portions.

Figure 5:
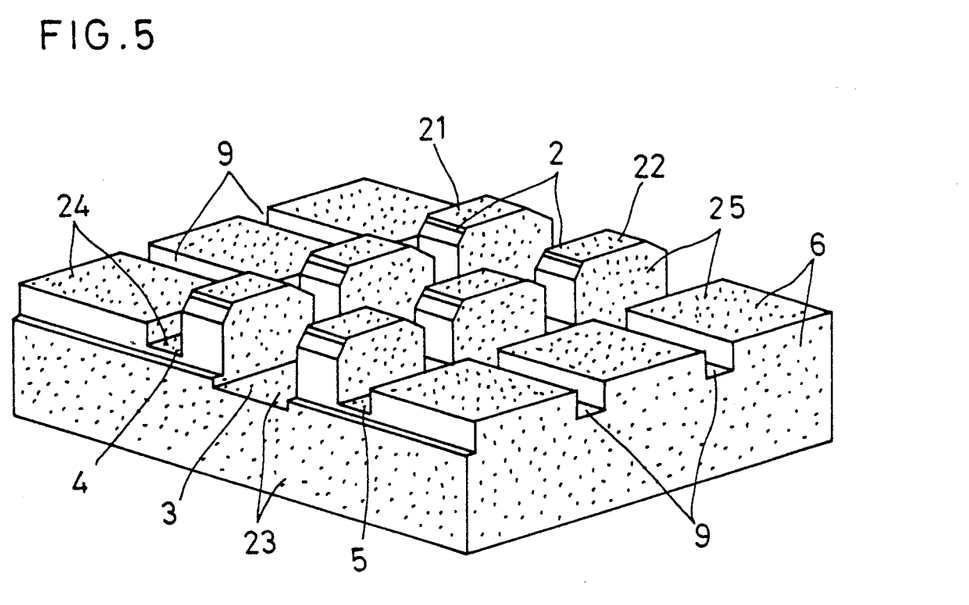

Next, as shown in FIG. 5, using a diamond blade with a 15 μm blade width, one end of the bevelled convex portion and then the innermost central portion of the respective V-shaped grooves 8 are cut in parallel with the V-shaped grooves 8 so as to form grooves 9 with a width d of 140 μm, the grooves 9 acting to separate the independent electrodes. Further, at the last V-shaped groove 8, the PLZT wafer 1 is cut along a line passing through the innermost portion of the groove 8. In this condition, the independent-electrode-separator groove 9 has the depth d (=140 μm) which is less than the depth a (=160 μm) of the common electrode groove 3 but is greater than the depth b (=120 μm) of the independent electrode grooves 4 and 5. Accordingly, with this groove 9, the convex shutter portions are separated while forming the projecting shutter elements 21 and 22 therebetween. Also, the aluminum film 6 on the surface of PLZT wafer 1 in the grooves 4 and 5 is cut off, whereby independent electrodes 24 and 25 for the respective shutter elements 21 and 22 are formed in separation on the surface of PLZT wafer 1. On the other hand, a bottom face of the common electrode groove 3 is not cut by the separator groove 9 and is still coated continuously with the aluminum film 6, whereby the bottom face constitutes a common electrode 23 for the shutter elements 21 and 22. Incidentally, in this condition, the common electrode 23 extends from an end of the groove 3 through the side face of PLZT wafer 1 coated with the aluminum film 6 to be connected with the independent electrodes 24 and 25 separated on the surface of wafer 1.

Figure 6:
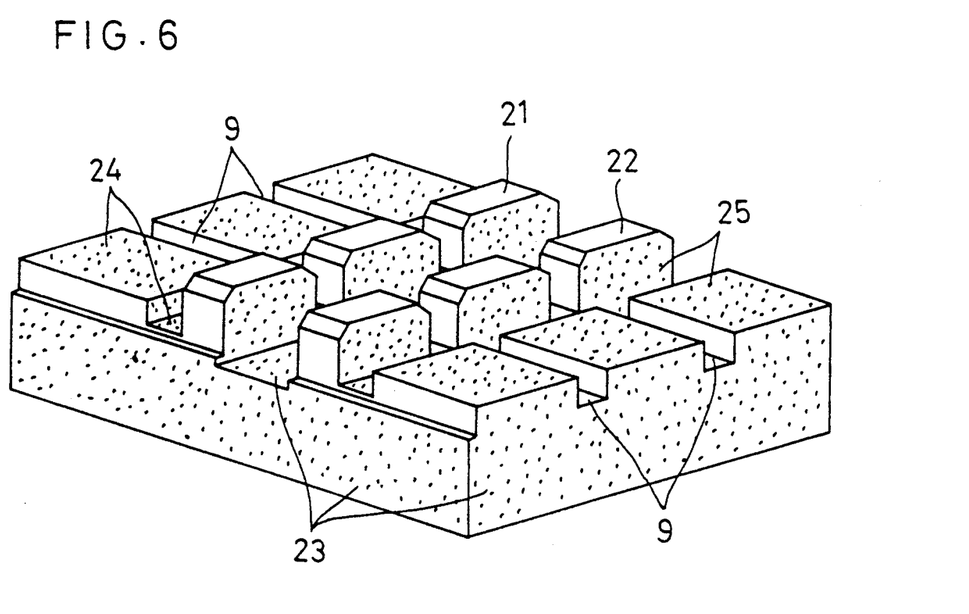

Next, from upper faces of the shutter elements 21 and 22, the resist film 2 and the aluminum film 6 coated thereon are removed together with in order to form shutter windows of the elements 21 and 22 as shown in FIG. 6. Each shutter window is operable to selectively permit light transmission therethrough. This film removal operation needed for forming the shutter windows was easily effected by the lift-off method, in which the resist film 2 was chemically etched away using PIQ etchant (manufactured by Hitachi Kasei Corp.) which is a hydrazone solution.

Figure 7:
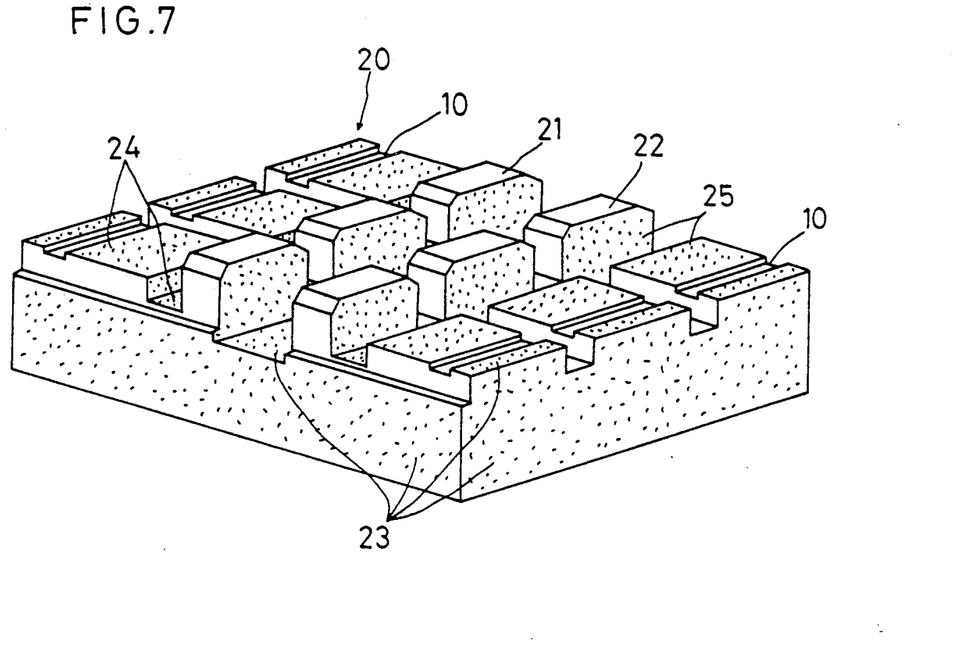
Figure 8:
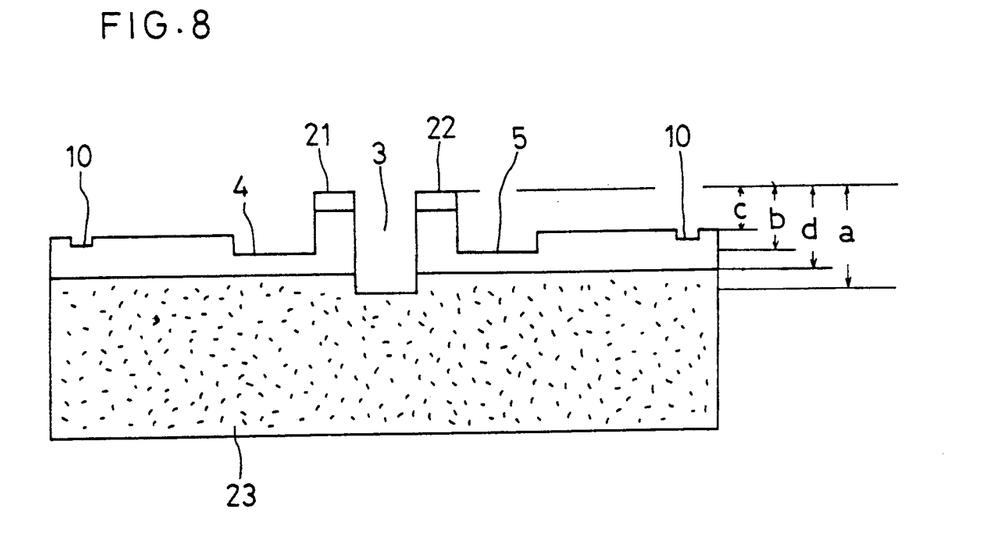
FIG. 8 is a side view of the light shutter means of the first embodiment.

Further, as shown in FIG. 7 and FIG. 8, a pair of further separator grooves 10 are cut along the X axis with a predetermined distance from each of the opposing Y-axis sides of the PLZT wafer 1, thereby separating the common electrode 23 from the independent electrodes 24 and 25.

As the result, a light shutter means 20 of this embodiment formed through the above-described processes includes an array of the shutter elements 21 and 22 formed three-dimensionally at the sides of the groove 3 of the common electrode 23 with the common electrode 23 extending from the end of groove 3 through the side face of wafer 1 coated with the aluminum film 6 to the width-wise ends of the surface of the wafer 1.

As described hereinbefore, for permitting the mechanical cutting of shutter elements in the grating-like formation, the shutter elements are disposed such that their shutter windows are overlapped with each other as viewed from a direction normal to the direction of shutter element array extension on the chip's upper face.

Figures 9, 10:
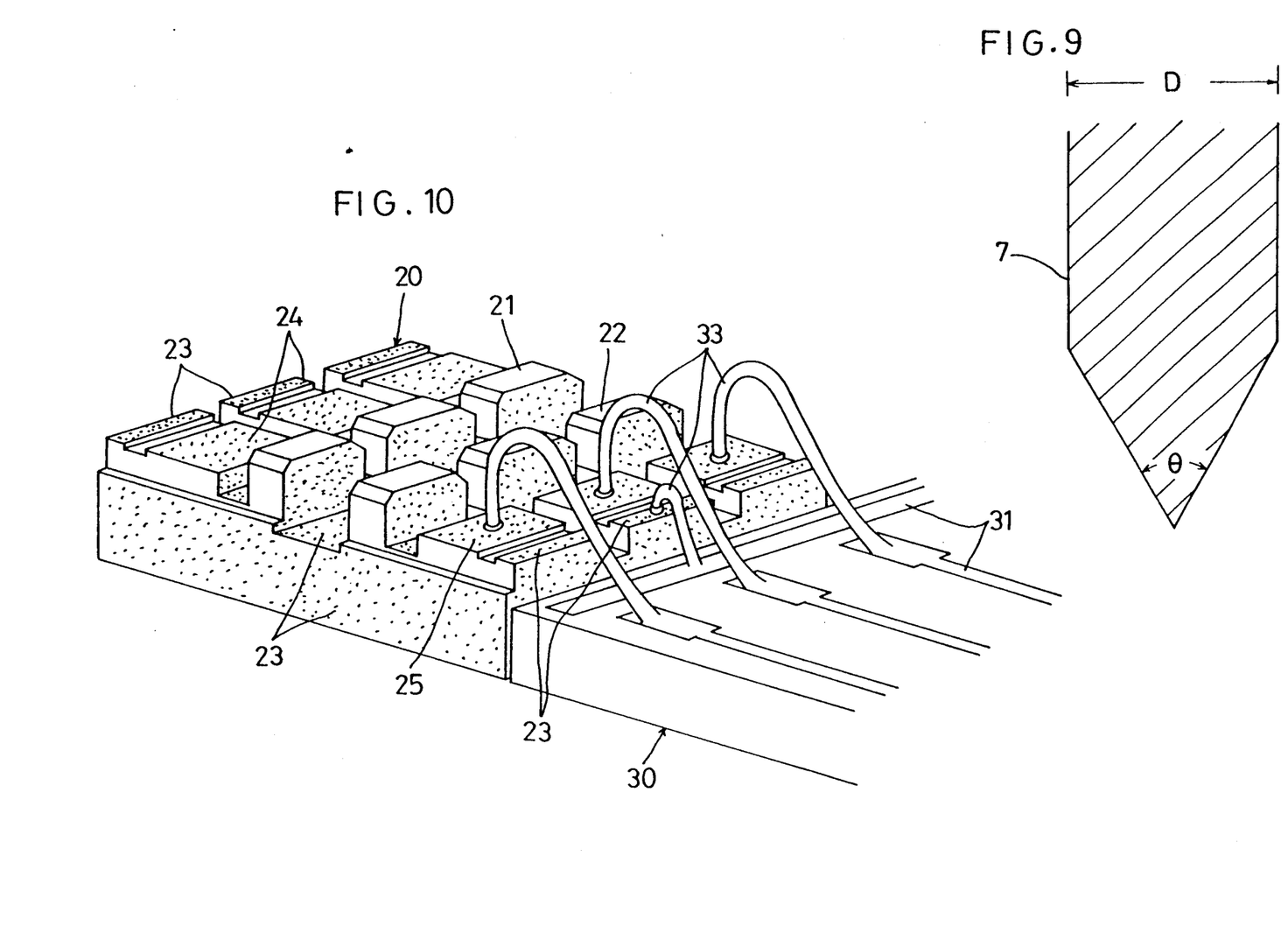
FIG. 9 is a section of a diamond blade employed for cutting V-shaped grooves in a manufacturing process of the light shutter means of this embodiment.
FIG. 10 is a persepective view showing a condition where the light shutter means is connected with an external circuit.

For driving this light shutter means 20, the independent electrodes 24 and 25 of the shutter elements 21 and 22 and the common electrode 23 need to be respectively bonded with wire-patterns 31 of an external circuit 30 by wires 33. Then, as shown in FIG. 10, the common electrode 23 is bonded with the pattern 31 by means of wire 33 at a portion thereof extended to the width-wise end of the wafer surface. This bonding or connection between the common electrode 23 and the external circuit 30 may be carried out much more easily than the conventional bonding or connection between external circuit 30 and the narrow groove portion 3 between an adjacent pair of shutter elements 21 and 22.

Incidentally, the bonding portions with the wires 33 should be fixed by an elastic insulator material such as silicon rubber for protecting the same from external shocks or the like. In this case, if the silicon rubber has a light-blocking characteristic and its viscosity is conveniently selected, the applied silicon rubber flows into the independent-electrode-separator grooves 9. Then, it becomes possible to light-block these grooves 9 where light leakage tends to occur due to manufacturing distortion or scattering. As a result, the optical contrast of the light shutter may be further improved.

Figure 11:
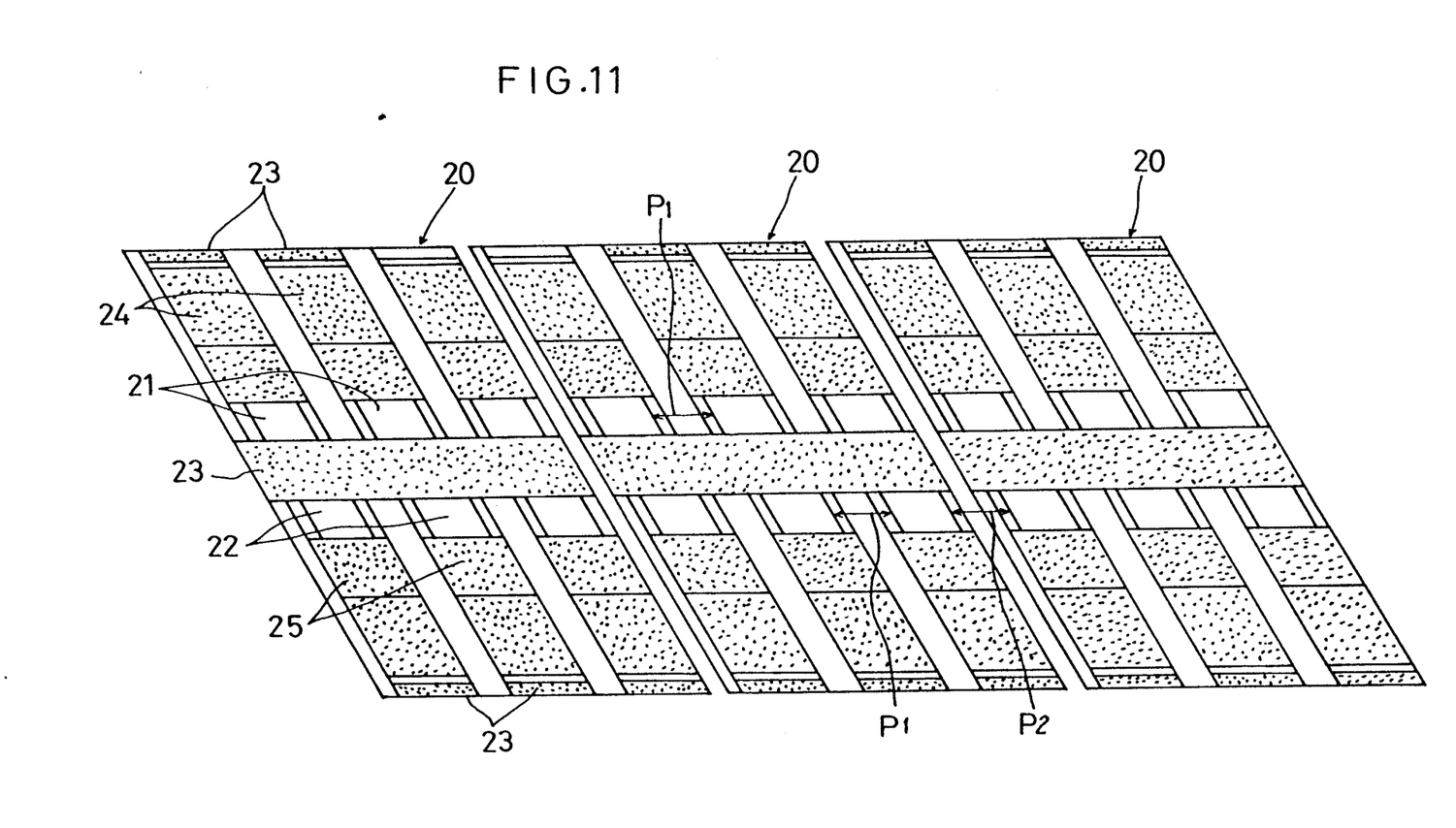
FIG. 11 is a plane view showing a plurality of the light shutter means being aligned.

Further, when this light shutter means 20 is used as an optical printer head, as shown in FIG. 11, a plurality of the light shutter means 20 are aligned with their independent electrodes 24 and 25 common electrode 23 being connected with external circuits in the manner decribed hereinbefore.

In this case, however, care should be taken as to the distance between an adjacent shutter array pair such that an X-axis distance P1 between the shutter elements 21 or 22 of one shutter array equates with a distance P2 between an adjacent shutter element pair of the other array.

Incidentally, experiments show that the above-described light shutter means 20 achieves a high resolution of 12 dot/mm.

Next, one example of use of a plurality of aligned light shutter means as an optical recording head will be described by way of example of an electrophotographic printer.

Figure 12A:
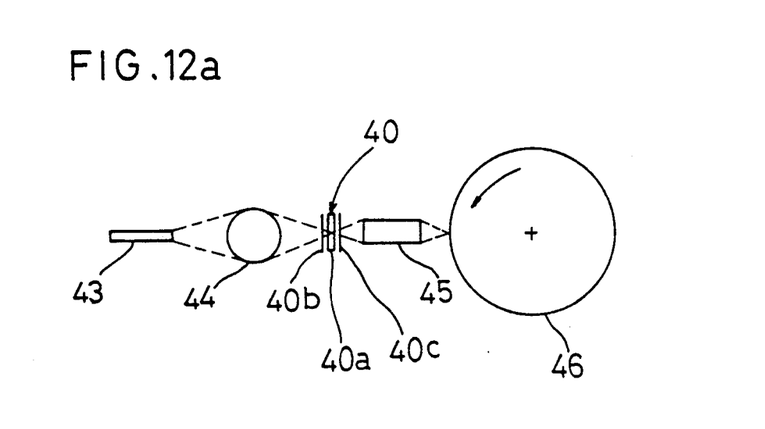
FIG. 12a is a schematic view of an electrophotographic printer having an optical recording head equipped with the light shutter means of the present invention.
Figure 12B:
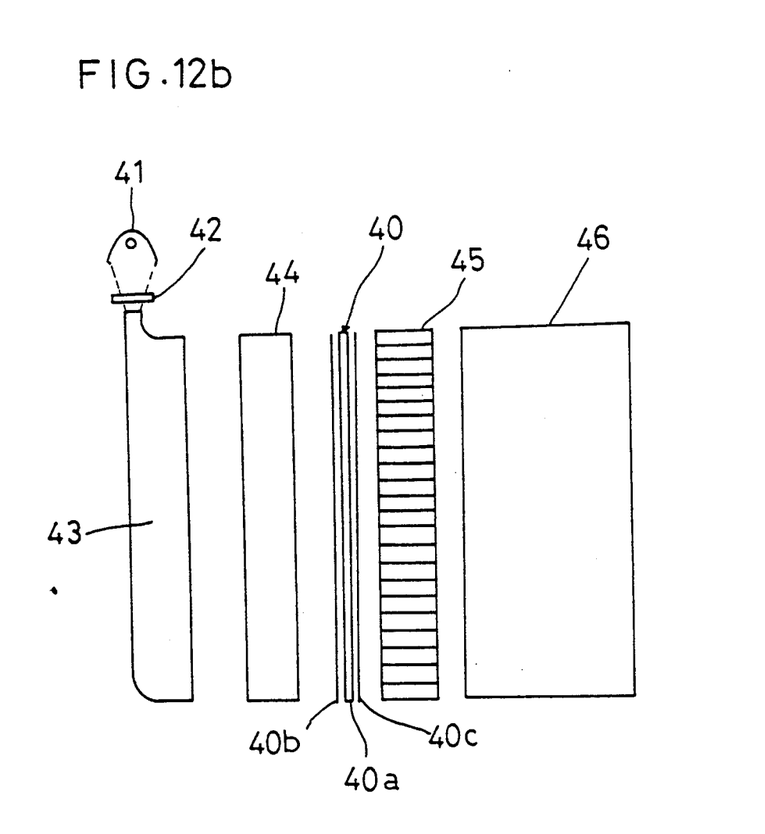
FIG. 12b is an enlarged view of the optical recording head equipped with the light shutter means of the present invention.

In the case of electrophotographic printer, as shown in FIGS. 12a and 12b, an optical recording head 40 is disposed between a rod lens 44 on which a light guided by an optical fiber light guide 43 is irradiated and a converging rod lens array 45 for applying the light onto a photoreceptor drum 46. The optical recording head 40 includes a polarizer 40b, an analyzer 40c and a plurality of light shutter arrays 40a aligned as illustrated in FIG. 11. In operation, the light from a halogen lamp 41 is guided through a heat absorbing filer 42 to the light guide 43. Then, the light guided by this light guide 43 is irradiated onto the rod lens 44 and the light converged therethrough is applied to the optical recording head 40. Thereafter, some of the shutter elements aligned in this recording head 40 are driven for selective transmission of the incident light therethrough. Thus transmitted light is converged through the converging rod lens array 45 and applied onto the photoreceptor drum 46 for forming dot image thereon.

Next, light shutter means related to alternate embodiments of the present invention will be described. In the following, it is to be noted, the emphasis is placed on differences from the foregoing first embodiment.

Figure 13A:
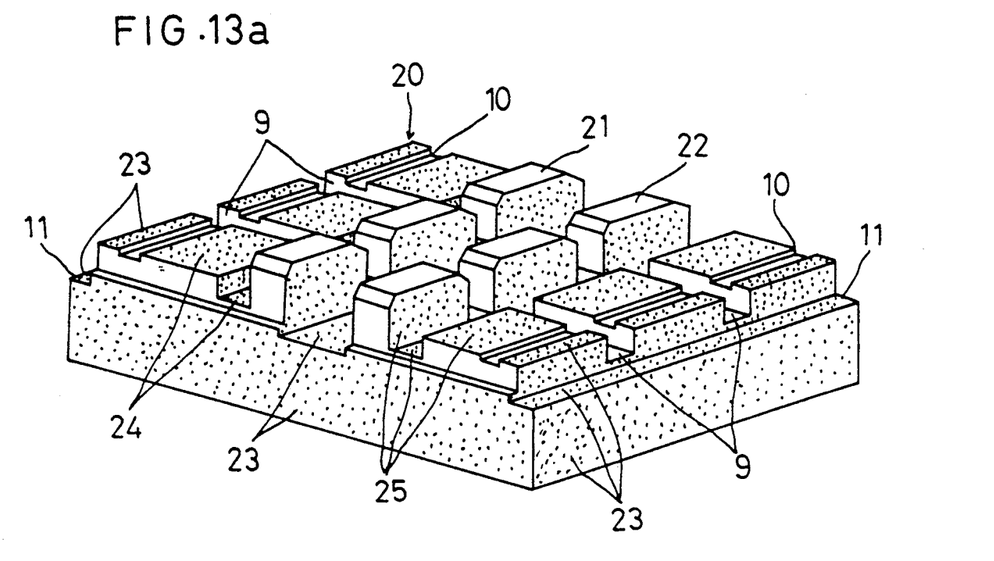
FIGS. 13a and 13b are a perspective view and a plane view respectively of a light shutter means related to a second embodiment of the present invention.
Figure 13B:
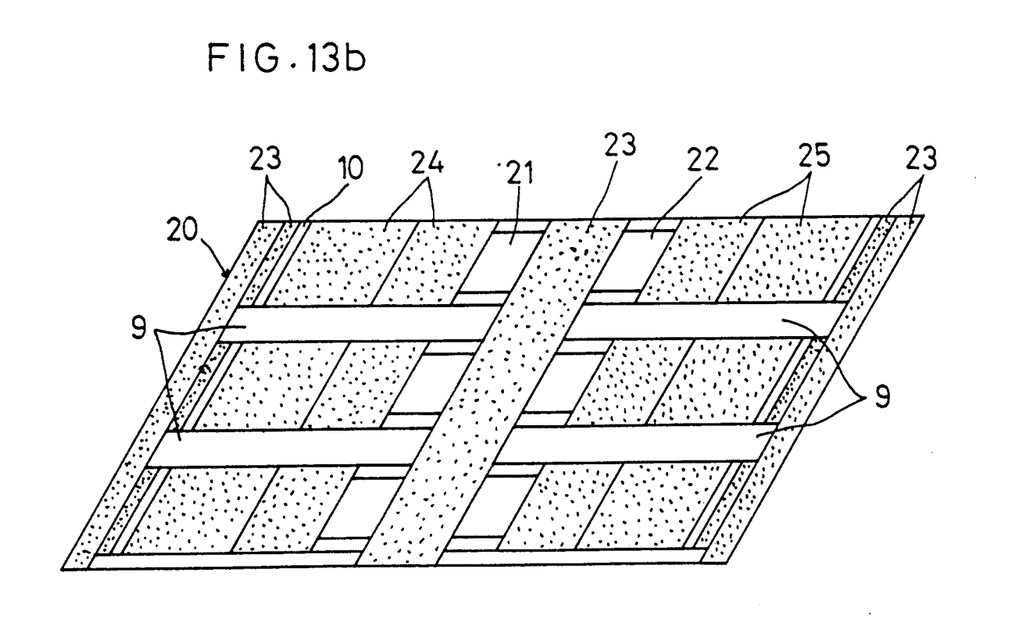

According to a light shutter means 20 in FIGS. 13a and 13b of the second embodiment, prior to the formation of electrode aluminum film 6 on the surface and side faces of PLZT wafer 1, the width-wise, i.e. Y-axis-wise ends of the wafer surface are cut in depth deeper than the independent-electrode-separator grooves 9 to be cut later, whereby step portions 11 are formed at the surface ends.

The rest of the construction and manufacturing processes of this light shutter means 20, are the same as those in the first embodiment.

In this light shutter means 20, the common electrode 23 extends from the end of common electrode groove 3 through the side faces of PLZT wafer 1 coated with the aluminum film 6 and also through the step portions 11 to reach the width-wise ends of the surface of wafer 1. Also, the common electrode 23 is connected with an external circuit at the step portion 11.

Figure 14:
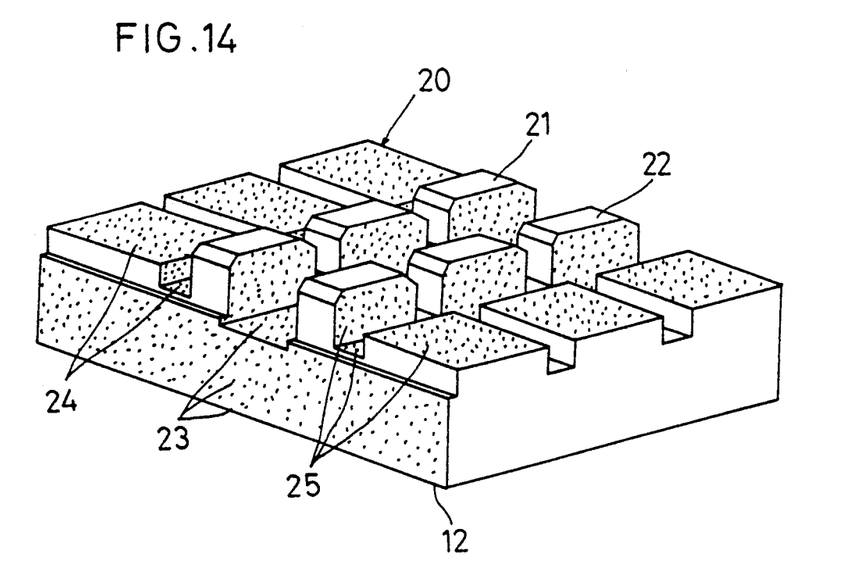
FIG. 14 is a perspective view of a light shutter means related to a third embodiment.

A further light shutter means 20 related to a third embodiment of the present invention will be described next with reference to FIG. 14. In the case of this shutter means, prior to the formation of electrode aluminum film 6 on the surface and side faces of PLZT wafer 1, there is formed on a back face of the PLZT wafer 1 a transparent ITO electrode film 12 with a thickness of approximately 0.2 μm through a cleaning treatment by reverse sputtering and sputtering under conditions specified in Table 2 below. Further, in order to separate the common electrode 23 from the respective independent electrodes 24 and 25, the width-wise (i.e. Y-axis-wise) ends of wafer 1 are cut off. The rest of the construction and manufacturing processes of this third embodiment shutter means 20 are the same as those in the first embodiment.

TABLE 2

| source | reverse sputtering high frequency wave | sputtering same as left |
|---|---|---|
| vacuum degree | 5 × 10$^{-2}$ Torr | 5 × 10$^{-2}$ Torr |
| power | 100 W | 300 W |
| time | 1 min | 5 min |

With this third embodiment light shutter means 20, the common electrode 23 extends from the end of the common electrode groove 3 through the side faces of PLZT wafer 1 coated with the aluminum film 6 to reach the ITO electrode film 12 on the back face of wafer 1. Then, the common electrode 23 may be connected with the external circuit at the side faces of wafer 1 or the back face of the same coated with the ITO electrode film 12. The formation of ITO electrode film 12 on the back face of PLZT wafer 1 has the advantage of decreasing reflection of light incident on the shutter means 20 thereby improving the light-transmission characteristics of the same.

Figure 15:
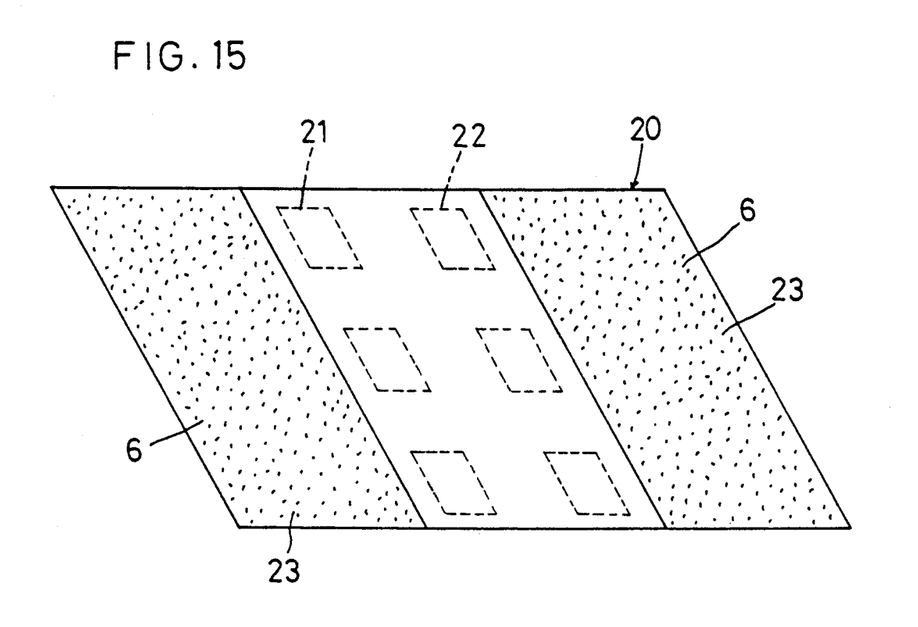
FIG. 15 is a bottom view of a light shutter means related to a fourth embodiment.

A still further light shutter means 20 related to a fourth embodiment of the present invention will be described next with reference to FIG. 15. In this fourth embodiment shutter means, the electrode aluminum film 12 is formed on the back face of PLZT wafer 1 at least except for the shutter portions prior to the formation of the same on the surface and side faces of wafer 1. In this case, the separation between the common electrode 23 and the respective independent electrodes 24 and 25 may be effected either by cutting the separator grooves 10 as in the first embodiment or by cutting the width-wise ends of the wafer 1 as in the third embodiment.

In this fourth embodiment light shutter means 20, the common electrode 23 extends from the end of common electrode groove 3 through the side faces of PLZT wafer 1 coated with the aluminun film 6 to reach the aluminum film 6 on the back face of wafer 1. Accordingly, the common electrode 23 may be connected with the external circuit at the side faces or back face of the PLZT wafer 1 coated with the electrode aluminum film 6.

Figure 16A:
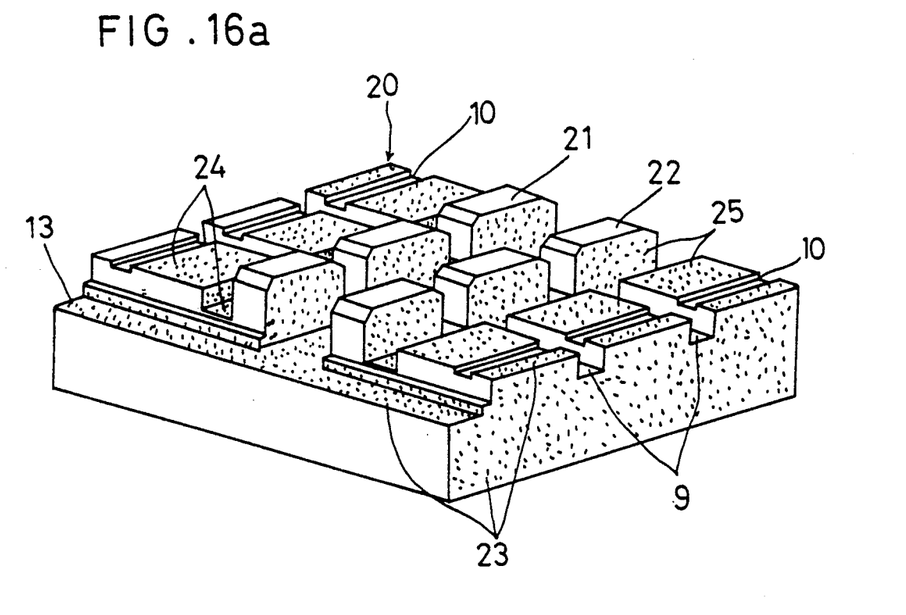
FIGS. 16a and 16b are a perspective view and a plane view respectively of a light shutter means related to a fifth embodiment of the present invention.
Figure 16B:
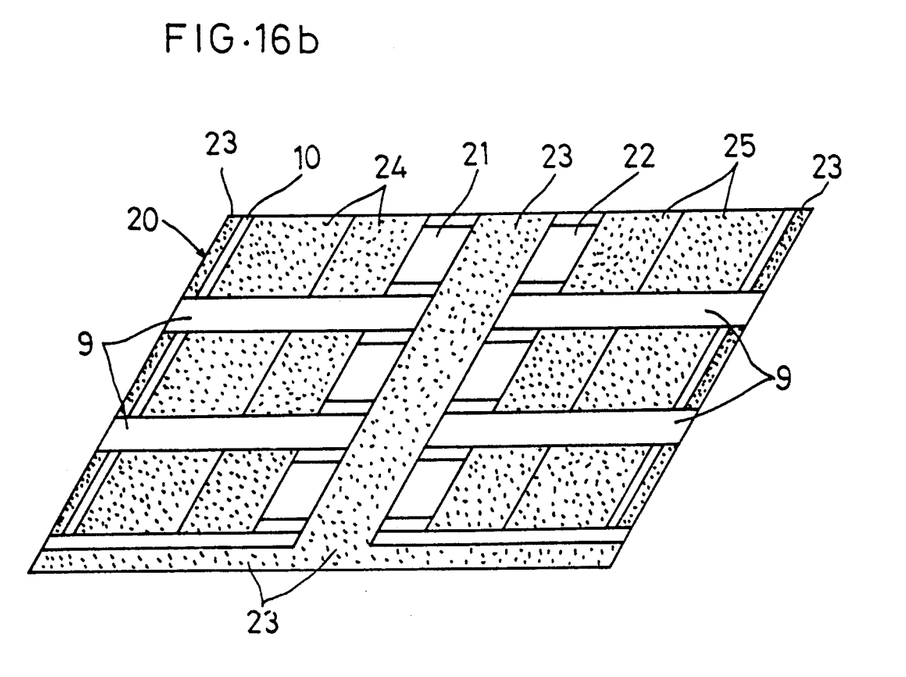

A still further light shutter means 20 related to a fifth embodiment of the present invention will be described next with reference to FIGS. 16a and 16b. In this fifth embodiment light shutter means 20, prior to the formation of electrode aluminum film 6 on the surface and side faces of PLZT wafer 1, a step portion 13 having the same depth as the common electrode groove 3 to be cut later is formed by cutting the surface of wafer 1.

The rest of the construction and manufacturing processees are the same as those in the first embodiment.

With this fifth embodiment light shutter means 20, the common electrode 23 extends from the end of the common electrode groove 3 through the step 13 coated with the aluminum film 6 to reach the width-wise (i.e. Y-axis-wise) ends of the surface of PLZT wafer 1. The connection with the external circuit 30 for driving this light shutter array is effected in the same manner as in the first embodiment.

According to the light shutter means 20 related to the first through fifth embodiments of the present invention, although the respective shutter elements 21 and 22 are formed by cutting processes, there occurs almost no light leakage at the edge portions of the shutter elements 21 and 22, whereby each means 20 achieves an extremely high optical contrast. This may be attributed to the arrangement of the upper edges of elements 21 and 22 being chipped off by the V-shaped grooves 8 such that the light components incident on the edge portions are reflected by the bevelled portions.

What is claimed is:

1. A light shutter means comprising:
   a plurality of shutter elements formed of a material having an electro-optical effect, said elements defined independently and three-dimensionally on an upper face of a substantially polyhedral chip and aligned in at least two arrays; each said element having a shutter window for selective light transmission therethrough; and
   a common electrode, formed between said arrays, and extending at least from one end thereof to a first side face of the chip nearest said one end;
   wherein the shutter elements of one array are disposed parallel with the shutter elements of the other array on said upper face of said chip.

2. A light shutter means as claimed in claim 1, wherein said electro-optical material is PLZT.

3. A light shutter means as claimed in claim 1, wherein said shutter window of the shutter element is parallelogram shaped.

4. A light shutter means as claimed in claim 1, wherein said common electrode is formed on a second side face of the chip parallel with said shutter element, said common electrode being continuous between said first side face and said second side face.

5. A light shutter means as claimed in claim 4, wherein said common electrode is formed on a step portion formed at an upper edge of said second side face, said common electrode being continuous between said second side face and said step portion.

6. A light shutter means as claimed in claim 5, wherein said common electrode is wire-bonded with an external circuit at said step portion.

7. A light shutter means as claimed in claim 6, wherein said wire-bonded portion is secured by an elastic insulating material.

8. A light shutter means as claimed in claim 7, wherein said elastic insulating material is silicon rubber having a light-blocking property.

9. A light shutter means as claimed in claim 8, wherein independent electrodes to be provided for said respective shutter elements in correspondence with said common electrode are formed through sectioning of a prepared electrode layer by cutting grooves therein.

10. A light shutter means as claimed in claim 9, wherein said light-blocking silicon rubber is introduced also into said independent-electrode-separator grooves.

11. A light shutter means as claimed in claim 1, wherein said common electrode is formed on a back face of the chip and is continuous between said first side face and said back face.

12. A light shutter device comprising:
a plurality of light shutter means, each including a plurality of aligned light shutter arrays;
a polarizer disposed on a light-incident side of each said light shutter array; and
an analyzer disposed on a light-emitting side of each said light shutter array;
each said light shutter array including;
a plurality of shutter elements formed of a material having an electro-optical effect, said elements being formed independently and three-dimensionally on an upper face of a substantially polyhedral chip and aligned in at least two arrays; each said element having a shutter window for selective light transmission therethrough, and
a common electrode, formed between said arrays, and extending at least from one end thereof to a first side face of the chip nearest said one end;
wherein the shutter elements of one array are disposed parallel with the shutter elements of the other array on said upper face of said chip.

13. A light shutter device as claimed in claim 12, wherein said electro-optical material is PLZT.

14. A light shutter device as claimed in claim 12, wherein said shutter window of the shutter element is parallelogram shaped.

15. A light shutter device as claimed in claim 12, wherein said common electrode is formed on a second side face of the chip parallel with said shutter element array, said common electrode being continuous between said first side face and said second side face.

16. A light shutter device as claimed in claim 15, wherein said common electrode is formed on a step portion formed at an upper edge of said second side face, said common electrode being continuous between said second side face and said step portion.

17. A light shutter device as claimed in claim 16, wherein said common electrode is wire-bonded with an external circuit at said step portion.

18. A light shutter device as claimed in claim 17, wherein said wire-bonded portion is secured by an elastic insulating material.

19. A light shutter device as claimed in claim 18, wherein said elastic insulating material is silicon rubber having a light-blocking property.

20. A light shutter device as claimed in claim 19, wherein independent electrodes to be provided for said respective shutter elements in correspondence with said common electrode are formed through sectioning of a prepared electrode layer by cutting grooves therein.

21. A light shutter device as claimed in claim 20, wherein said light-blocking silicon rubber is introduced also into said independent-electrode-separator grooves.

22. A light shutter device as claimed in claim 12, wherein said common electrode is formed on a back face of the chip and is continuous between said first side face and said back face.

23. A light shutter device as claimed in claim 12, wherein said shutter arrays are aligned in parallel with each other with a distance between said shutter elements along said shutter element arrays being constant.

24. A light shutter means comprising:
a plurality of shutter elements formed of a material having an electro-optical effect, said elements defined independently and three-dimensionally on an upper face of a substantially polyhedral chip and aligned in at least two arrays; each said element having a shutter window for selective light transmission therethrough; and
a common electrode formed between said arrays on said upper face and extending to a step portion provided on an upper edge of a first side face which is placed adjacent to one end of said common electrode on said upper face, said common electrode being continuous between said upper face and said step portion;
wherein the one array having said shutter elements are disposed parallel with the other array having said shutter elements on said upper face of said chip.

25. A light shutter means as claimed in claim 24, wherein said common electrode is formed on a second side face of the chip parallel with said shutter element array, said common electrode being continuous between said step portion and said second side face.

26. A light shutter device comprising:
a plurality of light shutter means with each including a plurality of aligned light shutter arrays;
a polarizer disposed on a light-incident side of each said light shutter array;
an analyzer disposed on a light-emitting side of each said light shutter array;
a plurality of shutter elements formed of a material having an electro-optical effect, said elements being formed independently and three-dimensionally on an upper face of a substantially polyhedral chip and aligned in at least two arrays; each said element having a shutter window for selective light transmission therethrough; and
a common electrode formed between said arrays on said upper face and extending to a step portion provided on an upper edge of a first side face which is placed adjacent to one end of said common electrode on said upper face, said common electrode being continuous between said upper face and said step portion;
wherein the one array having said shutter elements are disposed parallel with the other array having said shutter elements on said upper face of said chip.

27. A light shutter means as claimed in claim 26, wherein said common electrode is formed on a second side face of the chip parallel with said shutter element array, said common electrode being continuous between said step portion and said second side face.

28. A light shutter means comprising:
a plurality of shutter elements formed of a material having an electro-optical effect, said elements defined independently and three-dimensionally on an upper face of a substantially polyhedral chip and aligned in at least two arrays; each said element having a shutter window for selective light transmission therethrough; and
a common electrode formed between said arrays and at least extending from one end thereof to a first side face of the chip directly adjacent said one end;
wherein the one array having said shutter elements is disposed parallel with the other array having said shutter elements on said upper face of said chip.

29. A light shutter means comprising:
a plurality of shutter elements formed of a material having an electro-optical effect, said elements defined independently on an upper face of a substantially polyhedral chip and aligned in at least two arrays; each said element having a shutter window for selective light transmission therethrough;

a common electrode formed between said arrays and at least extending from one end thereof to a first side face of the chip directly adjacent said one end;

wherein the one array having said shutter elements is disposed parallel with the other array having said shutter elements on said upper face of said chip.

* * * * *